United States Patent [19]
Boytim et al.

[11] Patent Number: 6,078,622
[45] Date of Patent: Jun. 20, 2000

[54] DISTRIBUTED DIGITAL RADIO SYSTEM

[75] Inventors: Mathew Alan Boytim, Kokomo, Ind.; Russell Wilbur Pogue, Jr., Greentown, Ind.

[73] Assignee: Delco Electronics Corporation, Kokomo, Ind.

[21] Appl. No.: 08/995,924

[22] Filed: Dec. 22, 1997

[51] Int. Cl.[7] .............................. H04B 3/00; H04L 25/00
[52] U.S. Cl. ..................... 375/257; 375/219; 455/562
[58] Field of Search .................................... 375/257, 259, 375/219, 316; 455/31.1, 507, 562; 340/854.9, 855.1

[56] References Cited

U.S. PATENT DOCUMENTS

| | | | |
|---|---|---|---|
| 5,794,153 | 8/1998 | Ariyavisitakual et al. | 455/507 |
| 5,825,302 | 10/1998 | Stafford | 340/870.01 |
| 5,892,442 | 4/1999 | Ozery | 340/539 |
| 5,907,289 | 5/1999 | Kondo | 340/825.44 |
| 5,943,623 | 8/1999 | Yehushua et al. | 455/550 |

*Primary Examiner*—Chi H. Pham
*Assistant Examiner*—Bryan Webster
*Attorney, Agent, or Firm*—Jimmy L. Funke

[57] ABSTRACT

A central digital signal radio processor (DRSP) is separated from all analog inputs and outputs by digital data links. Each end of a data link couples to an interface which has transmit and receive capability using cancellation techniques to allow full duplex transmission. An antenna module located at the antenna processes much of tuning functions in analog and then converts the signal to digital and sends it to the DRSP for further processing. Transmitted digital signal from the DRSP are converted to analog by the antenna module and sent to the antenna. Microphones, tape and CD players and other inputs are similarly linked to the DRSP. The DRSP digital audio output is sent to speaker modules which convert to analog signals for driving speakers.

18 Claims, 6 Drawing Sheets

DISTRIBUTED DIGITAL RADIO SYSTEM

FIELD OF THE INVENTION

This invention relates to a radio system and particularly to a distributed system with digital signal processing and digital communication among separate modules.

BACKGROUND OF THE INVENTION

The advantages of digital technologies over analog are well known. The discrete nature of digital signals allows unambiguous interpretation and exact regeneration, totally eliminating the effects of noise and tolerance stackup within broad bounds. This tolerance to component variation has made it possible to manufacture extremely complex systems containing millions of elements on a single digital integrated circuit.

Systems which are inherently digital, or defined as such, require digital implementation and naturally benefit from the digital technology trends. Virtually all new systems being defined today are digital.

Systems which are inherently analog in nature can also be realized digitally. The analog signal must first be converted to a digital representation by sampling the signal at discrete instances in time and then quantizing the resultant samples to a discrete set of values. Although the digitization process itself cannot be perfect, the signal degradation due to digitizing can be made sufficiently small by sampling sufficiently fast and quantizing sufficiently finely. Once digitized, all operations can be performed arithmetically to any desired degree of precision, thus preserving the available fidelity of the original signal. The digital signal can be converted back to analog as needed.

In audio or radio systems, it is not possible. to completely eliminate the need for analog circuitry. The analog signal path is still required up to the point that conversion to digital is performed. The analog circuitry can be minimized by converting to digital as close to the analog signal source as possible, but the analog circuitry cannot be completely eliminated, forcing a mixed signal mode design. The analog-to-digital converter (ADC) itself is a mixed signal component.

There does exist a basic incompatibility between low level analog and digital circuitry. The switching nature of digital logic tends to generate significant electrical noise which usually does not interfere with the normal operation of other nearby digital circuitry. However this noise can be a problem in mixed signal designs due to the sensitive nature of analog circuitry to external interference. A sufficient level of isolation between the analog and digital sections can usually be achieved but is often challenging and may require iterated design. This is already experienced in automotive analog radio circuits having digital control inputs. In addition, although it is possible to accommodate both analog and digital circuitry on a single integrated circuit, most IC fabrication processes are not optimized well for both and may require additional processing steps.

Despite the many advantages, the transition from mostly-analog to mostly-digital of inherently analog systems has been slow although there is a definite trend and desire to do so. The primary disadvantage has always been cost. Replacing a few precision components with thousands of simple transistors has not proven to be cost effective but this is rapidly changing with continued advances in digital integrated circuit technology. As the economics of digital become more favorable, digital implementations of inherently analog systems will continue to emerge.

Traditional mobile radios are not architected appropriately to benefit well from the digital technology trends. The nature of the analog signal processing does not allow flexible partitioning of the signal path and almost necessitates that the entire radio electronics be contained within a single package. The inflexible nature of analog circuitry and the potential for interference has provided little incentive to integrate further which has resulted in a paradigm that separate radio receivers and/or transceivers must be designed and packaged independently. As the need for mobile communications has increased, this has resulted in several radio transceiver packages scattered throughout the vehicle, e.g., AM/FM radio, cellular phones, global positioning systems (GPS) and digital audio broadcast (DAB).

SUMMARY OF THE INVENTION

It is therefore an object of the invention to maximize digital signal processing and communication in radio systems subject to analog inputs and outputs. It is another object to eliminate replication of radio circuits by digital signal processing shared by a plurality of radio systems. Another object in such a system is to separately package the signal processing and digitally interconnect all other system components to that package.

A mobile communication system is naturally distributed. The antennas, speakers, microphones, controls and display must be logically placed according to function. With modern electronic control, the placement of the electronics portion of the system is subject to few constraints and can be located quite freely although the traditional approach would package the electronics directly behind the user interface, an influence of early mechanical control. Inexpensive digital interconnects have made it practical to physically separate the user interface from the functional electronics.

This distributed nature of mobile communication systems can be exploited in such a way to align the overall system to the digital technology trends. The inherently analog elements (antennas, speakers, microphones) with physical mounting constraints are logically at the boundary of the system; the analog elements are the interface to the analog world. By locating the necessary analog interface electronics and performing conversion to/from digital at the associated analog element, the inherently analog nature of the analog components can effectively be isolated from the remainder of the system. Digital interconnects join the analog elements to wholly digital circuitry which is readily utilized to perform the required signal processing functions.

This approach augments the primitive analog system elements with sufficient electronics to allow digital interfacing to other system components and derive benefit from the distributed nature. A portion of the circuitry simply represents a repartitioning of the system which becomes possible due to the communications capability afforded by the digital interconnect. Additional circuitry, such as a data converter and data link interface, must be added to support the distributed digital architecture.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

While the ensuing description is directed to mobile communications it will be seen that the principles of the system are appropriate for other applications as well, particular where a distributed radio system is desired.

Figure 1:
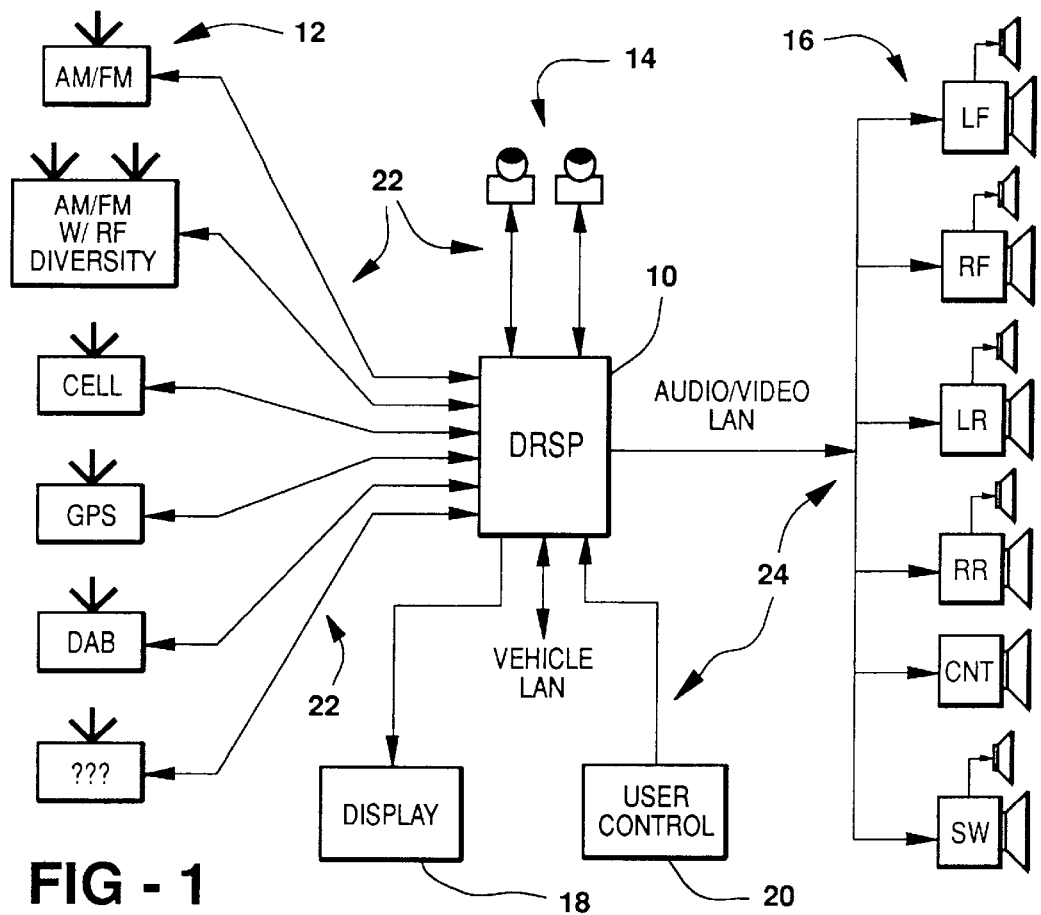
FIG. 1 is a diagram of a distributed radio system according to the invention.

The preferred embodiment of this invention is embodied in the architecture shown in FIG. 1. A single central digital processing unit, or digital radio signal processor (DRSP) 10, is shared by all communications tasks and surrounded by the digital peripheral elements necessary to interface with the user and the analog world. These peripheral elements includes remote antenna modules 12 for AM/FM, AM/FM with RF diversity (utilizing two spaced antennas), cellular phone, GPS, and DAB, for example. Other peripheral elements are remote microphone modules 14 for use with cellular phone or other transceiver applications and remote speaker modules 16. User interface is provided by a remote display 18 and a remote user control 20. A digital interface to the vehicle is also anticipated. Digital data links 22 couple the DRSP 10 with each of the peripherals 12–14 and links 24 couple the DRSP with peripherals 16–20. These links can be either electrical or optical, although electrical offers the advantage that power can also be provided via the data interconnect.

The circuitry near the analog elements must be packaged and mounted in the vehicle, receive power, and exchange information with the remainder of the system. A goal of the architecture is to minimize the analog circuitry, minimize external components, and to physically separate the analog and digital circuitry. Therefore, a minimum of total circuitry will be located in the remote components leading to a small physical size. This small size will allow the circuitry to be mounted directly to its associated analog element which can then be installed in the vehicle as a single sub-assembly, or 'module', requiring no additional assembly steps than the primitive element itself.

Digital Radio Signal Processor

The digital radio signal processor 10 is an all-digital component which is shared by all the communications tasks required by the system. This includes signal processing, arithmetic, and logical operations performed in both hardware and software. The DRSP can itself have distributed realization. The DRSP is connected to other components in the system via specialized digital interconnects. Dedicated electrical connections 22 are preferred for the antenna and microphone modules; a shared fiber optic network 24 is preferred for remaining components including speakers,. playback devices, displays and user interfaces. Other interconnect scenarios are possible and within the scope of this general architecture.

Figure 2:
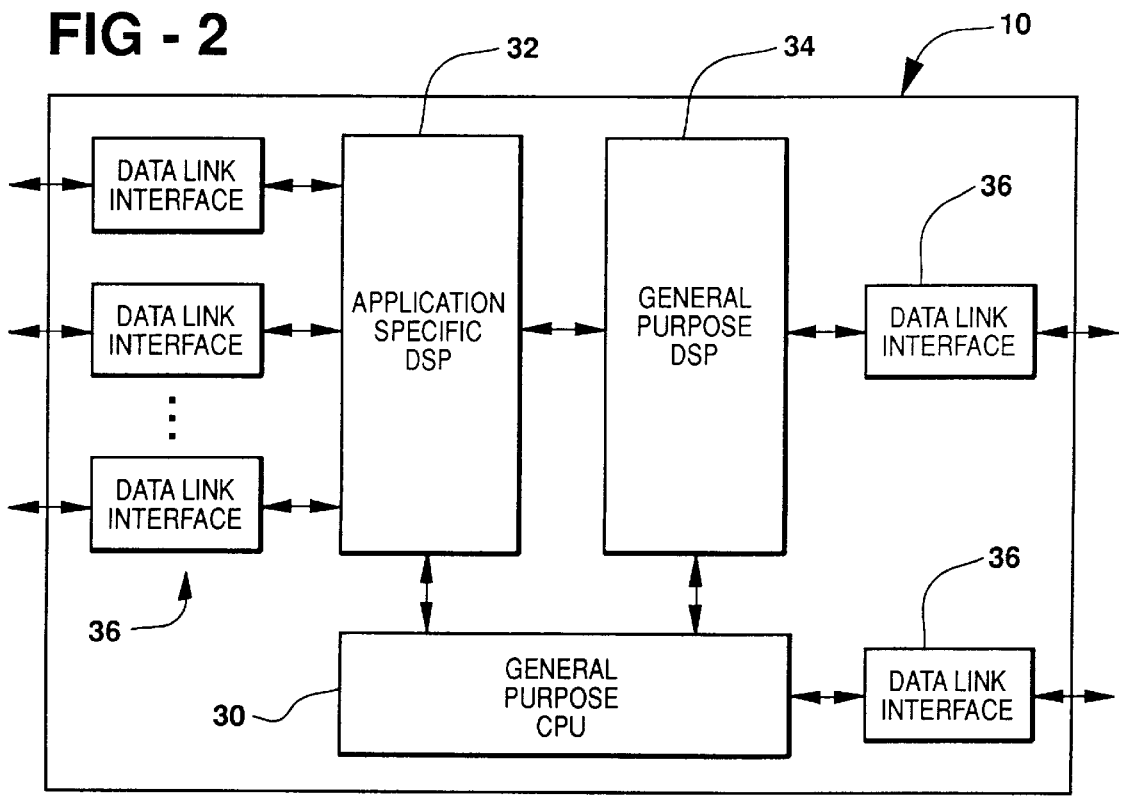
FIG. 2 is a schematic diagram of a central processor of the system of FIG. 1.

A block diagram indicating the logical partitioning of the digital radio signal processor is shown in FIG. 2. The physical partitioning into individual circuits is an implementation detail and could be somewhat different. A general purpose CPU 30 controls both application specific hardware 32 and general purpose hardware 34. Each of the elements is coupled by a data link interface (DLI) 36 to a data link 22 or 24. General purpose (programmable) hardware is preferred where flexibility is essential and economics will allow. Application specific hardware should have sufficient configurabilty under control of the general purpose hardware to further provide flexibility and minimize design risk. Examples of application specific hardware include hardware digital filters, CORDIC (Coordinate Rotation Digital Computer) processor, FFT (Fast-Fourier Transform) processor, and Viterbi decoder, the latter two devices being useful for DAB.

Remote Antenna Module

The remote antenna module 12 interfaces the antenna element itself to the central digital radio signal processor via an appropriate digital interconnect. The module must contain sufficient circuitry to select and digitize a receive signal and, for transceive applications, construct and amplify a transmit signal, and exchange information with the digital interconnect. It is possible to have multiple antennas associated with a single module and is within the scope of the general architecture.

The information bearing signal present on the antenna itself which is converted to digital is the primary signal. Other control and status information relevant to processing the primary signal, considered secondary information, must also be communicated with the central processor. Examples of secondary information are RF level, LO (local oscillator) frequency, and reference clock.

The preferred interconnect is a single coaxial cable 22 carrying all primary and secondary signals in both directions, plus power, although other interconnects are possible. This single coaxial cable replaces the coaxial cable typically associated with antennas, but allows the use of less costly cable and connectors.

The module must be packaged so as not to complicate the vehicle assembly process. A small module located at or very near the antenna base is preferred, although other packaging scenarios are possible.

Two basic approaches for digital radio may be considered; wide-band and narrow-band. The primary distinction is that the wide-band approach attempts to simultaneously digitize multiple radio channels, and possibly an entire radio band, while the narrow band approach digitizes only the desired channel of interest. The relative merits of each approach are preserved by the distributed digital architecture and are thereby fully compatible with this approach.

Figure 3:
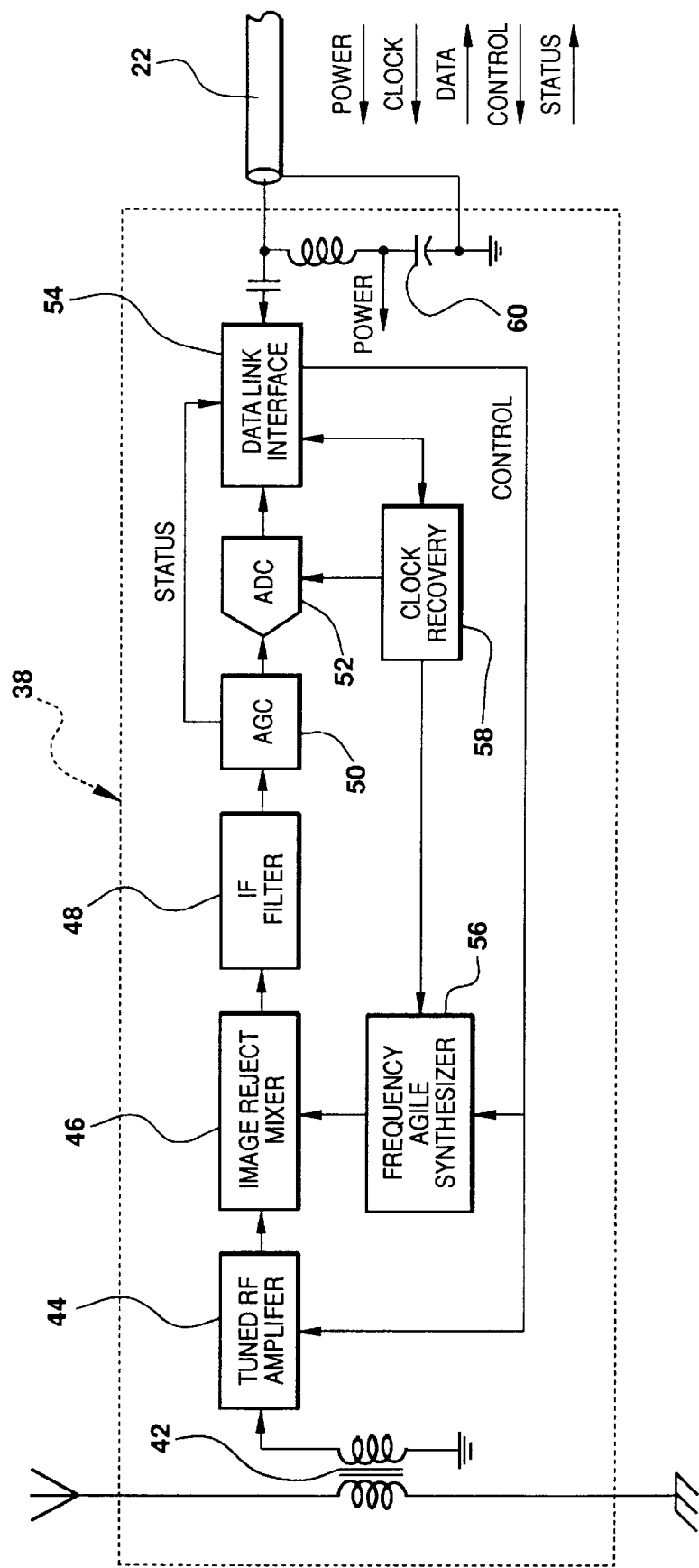
FIG. 3 is a schematic diagram of a receiver antenna module of the system of FIG. 1.
Figure 4:
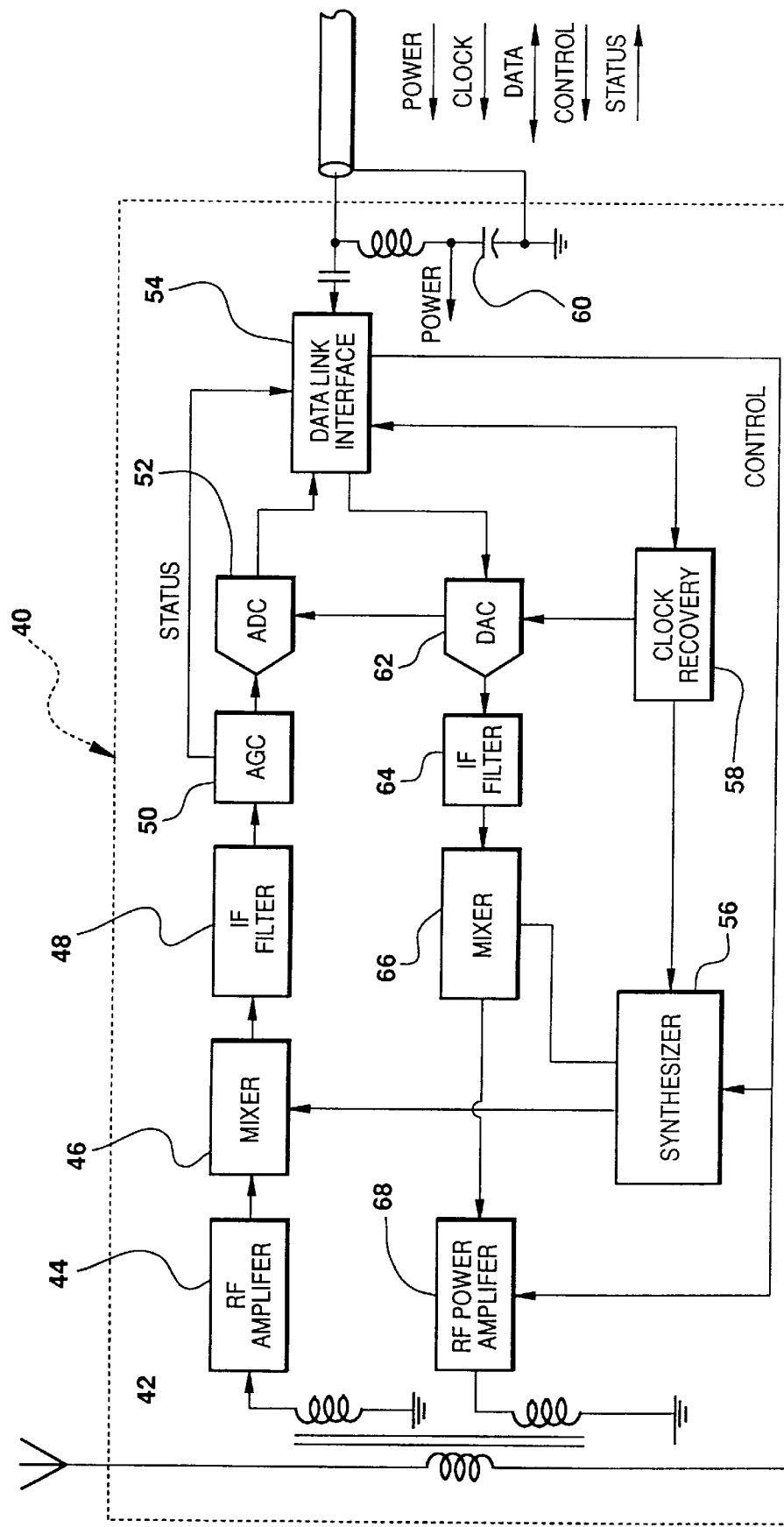
FIG. 4 is a schematic diagram of a receiver/transmitter module of the system of FIG. 1.

A block diagram of the antenna module for a typical (narrow-band) receive application 38 is shown in FIG. 3 and for a typical (narrow-band) transceive application 40 is shown in FIG. 4. Many details will vary according to the specific requirements of the individual radio services. The function of the module essentially represents a truncated signal path of an otherwise typical radio signal path, except for the addition of data converters and a data link interface. The 'missing' portions of the signal path are implemented digitally in the central processor or DRSP 10. In the embodiment shown here, the receiver antenna module 38 receives a band of frequencies from the antenna, amplifies the signal, mixes it with a local oscillator. signal, IF filters the mixed signal, then performs automatic gain control and converts the analog signal to a digital signal. The DRSP 10 completes the necessary radio functions by digital IF filtering, demodulation, detection, noise blanking, FM decoding (for FM mode), audio processing (noise concealment) and acoustic processing (operating on tone, speaker equalization, and volume) prior to sending a digital output to the speakers.

In the receive direction, the antenna signal is filtered with a tuned radio frequency (RF) network 42, 44 to avoid overload by undesired signals and then amplified in a tuned amplifier 44 and mixed in mixer 46 to an appropriate intermediate frequency (IF) and it is again filtered at IF filter 48 and amplified. In the digital radio application, the IF filter also performs the anti-aliasing function required for the conversion to digital. An automatic gain control (AGC) circuit 50 scales the signal to accommodate the limited dynamic range of an analog-to-digital converter (ADC) 52. The output of the ADC 52 is a digital representation of the signal which is then transmitted to the central processor by a data link interface (DLI) 54 and the coaxial cable 22. The local oscillator (LO) frequency required by the mixer 46 is generated by a digitally controlled synthesizer 56 under control of the central processor 10 via the DLI. The clock reference for the synthesizer 56, along with all other clocks needed by the module, is derived from a remote reference in the central processor available via the DLI and a clock recovery circuit 58. Alternatively, a local clock reference is generated and is made available to the central processor via the DLI. Secondary information, such as field strength, is also collected and transmitted to the central processor by the DLI. An LC filter 60 couples DC power from the interconnect 22 conductors to the module components and passes digital data in both directions.

The transceiver, shown in FIG. 4, incorporates all the elements 42–60 of the FIG. 3 circuit and adds a few components for transmission. In the transmit direction the signal in digital form is received by the module 40 from the central processor via the data link 22 and the DLI 54. An analog signal is constructed by a digital-to-analog converter (DAC) 62 at an appropriate IF, filtered at IF filter 64 then mixed to RF at mixer 66, amplified by an RF power amplifier 68, and transmitted by the antenna. All necessary control is performed remotely by the central processor via the DLI.

Antenna Module Data Link

The data link between a digital tuner located at the antenna and a central shared digital processor is the key to making a distributed digital system practical. All the necessary information must be conveyed over a low cost cable in such a way as to meet all the performance requirements in a simple integratable manner.

The interconnect should be no more than what is needed for just the antenna: a single coaxial cable, preferably of lower grade. Several kinds of information in digital form need to be passed over this cable in both directions. The digital representation of the radio signal is the primary payload and requires the highest data rate. For a receive only function, this data is from the remote unit to the central processor. For a transceiver function, this type of data needs to be transferred in both directions, possibly simultaneously. Control information to the remote unit and status information from it also need to be transferred concurrently with the radio signal data but at a much lower data rate. A precise frequency reference or clock is needed for the tuner function and data sampling. The central unit provides the reference signal. In addition, power must be provided to the remote unit.

The general approach in the preferred implementation is for each end to send and receive simultaneously over the same wire while DC power is also applied to the wire. This is done using a circuit which subtracts what is being sent from what is being received from the wire. This technique is commonly used on telephone circuits but not on data links where other factors are usually more important than saving a wire. Digital data does not require as much precision in the cancellation due to its higher tolerance to noise. The data is AC coupled to isolate it from the DC power on the wire.

Figure 5:
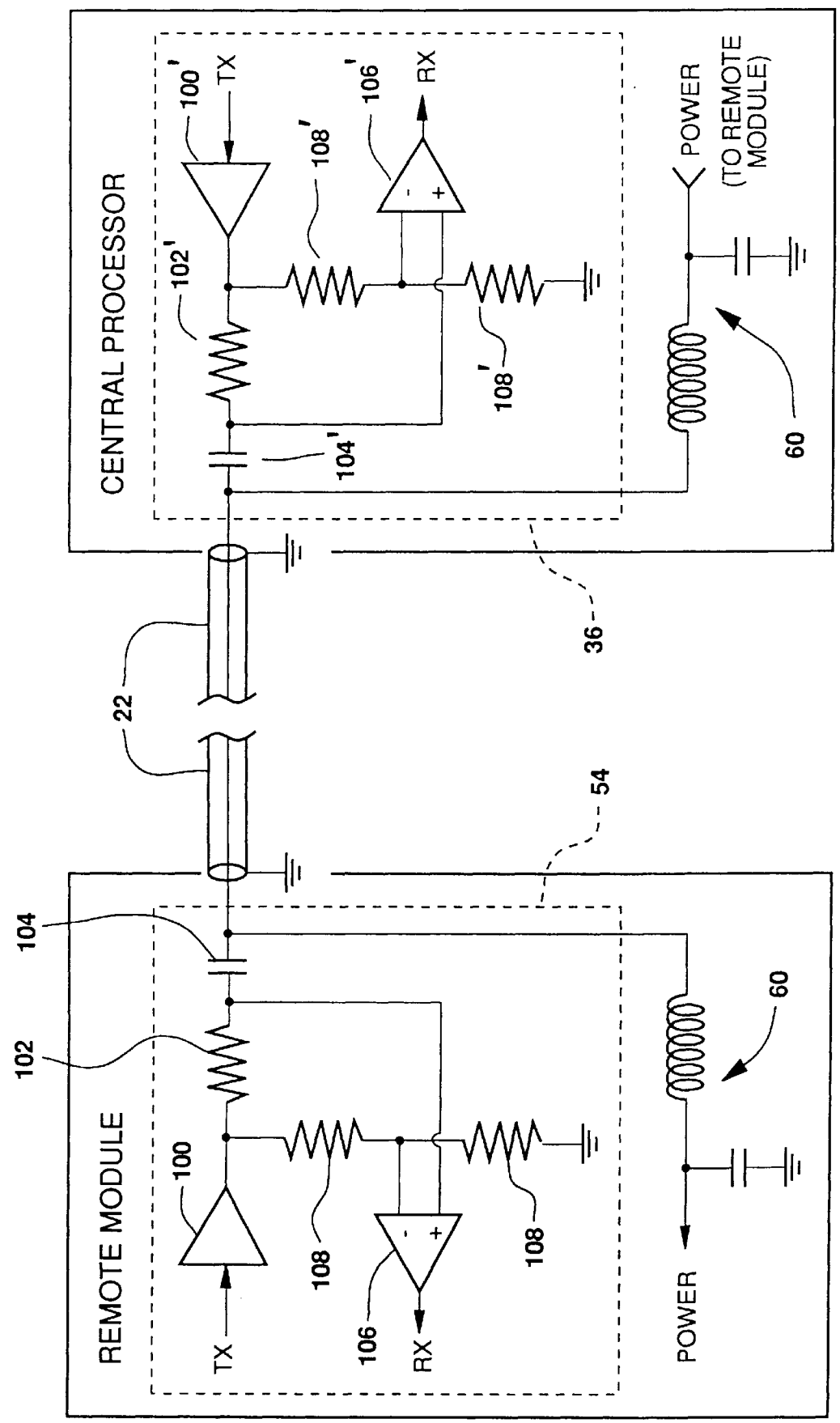
FIG. 5 is a schematic diagram of digital link interfaces for a receiver module and the central processor of the system of FIG. 1, according to the invention.

A typical data link for full duplex operation is shown in FIG. 5 for a remote module as well as for the central processor. In the data link interface 54 of the remote module the transmitted signal TX is sent through an operational amplifier 100 having its output connected through a resistor 102 and a capacitor 104 in series to the inner conductor of a coaxial cable 22. A subtraction amplifier 106 has its inputs connected across the resistor 102 to subtract the transmitted signal from the total cable signal. A scaling voltage divider comprising resistors 108 couples the negative input to the amplifier 100 output. The resulting output of the subtraction amplifier 106 is the signal RX received from the central processor. Similarly, the data link interface 36 in the central processor, corresponding amplifiers 100' and 106', resistors 102' and 108', and capacitor 104' coupled to the cable 22 form a data link to transmit and receive signal in the processor. Both the remote and central units have an LC filter 60 used in transmission of DC power from the central processor to the remote module.

The inbound and outbound data can each be a composite of different kinds of information such as reference frequency clock, high speed signal data and low speed control or status data. Data formats need to be optimized for each direction separately and should be synchronized to minimize the effect of incidental coupling. Using conventional techniques, all the low speed data for each direction can be combined into a single stream for that direction. The problem is then reduced to combining low speed, high speed and clock information in a single signal.

Figure 6:
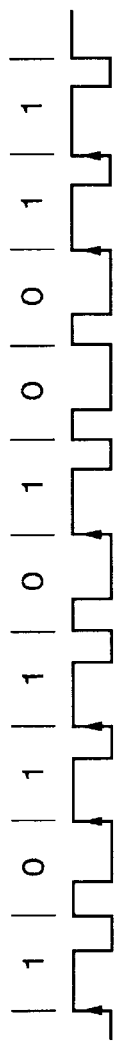
FIG. 6 is a bilevel waveform for transmitting clock data and other data from the central processor.

In the case of a remote FM tuner, clock and low speed data are sent to the remote unit while high speed data and low speed data are returned. In this example the clock frequency is 43 MHz, the returned data is synchronous at 43 Mbps while the low speed data is less than 5 Mbps. There are many ways to combine a clock with data but for this application ease of clock recovery with very low phase jitter is important. The preferred approach is a pulse width modulated (PWM) signal where one polarity edge is always present and always precisely aligned with the reference while the other polarity edge comes earlier or later to convey the information. This is illustrated in FIG. 6 by a two level signal which has a rising edge at precise times to provide a stream of clock pulses followed by a falling edge to form a long pulse width to represent "1" and a short pulse width to represent "0".

For transmission from the remote unit to the central unit, the data can be synchronous with the recovered clock so no extra transitions (edges) are needed for timing information. To reduce interference with clock recovery, it is desirable to minimize the number of edges and to avoid the vicinity of the clock edge. Simple non return to zero (NRZ) coding allows one data bit per clock cycle with no more than one edge per bit. Additional information can be carried by using more than one edge per bit, by using more than two logic levels or by using phase modulated NRZ (PMNRZ).

Figure 7:
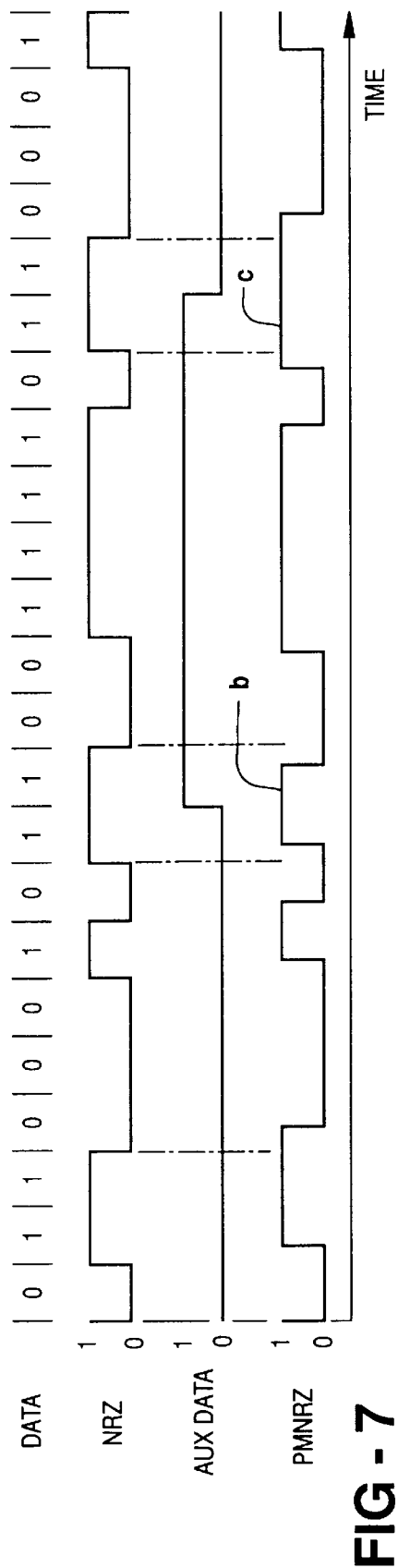
FIG. 7 is a set of waveforms illustrating a phase modulated non return to zero waveform for transmitting radio signal data and secondary data from a receiver module to the central processor.

The PMNRZ and NRZ waveforms are explained by FIG. 7. For NRZ, when the data repeats for successive bits (at least two 1's or 0's in a row) the signal level does not return to zero until the data changes, thereby reducing the amount of transitions compared to the PWM method of FIG. 6. The PMNRZ waveform is generated by retarding the transitions by ⅓ bit space (compared to the NRZ waveform) when the auxiliary data is 0 and advancing the transitions ⅓ bit space when the auxiliary data is 1. This results in reducing the period b and extending the period c to thereby convey the auxiliary data. In other words, when an edge does occur (because the main data has changed from 0 to 1 or 1 to 0) it is positioned either earlier or later in the bit time to convey additional information.

Figure 8:
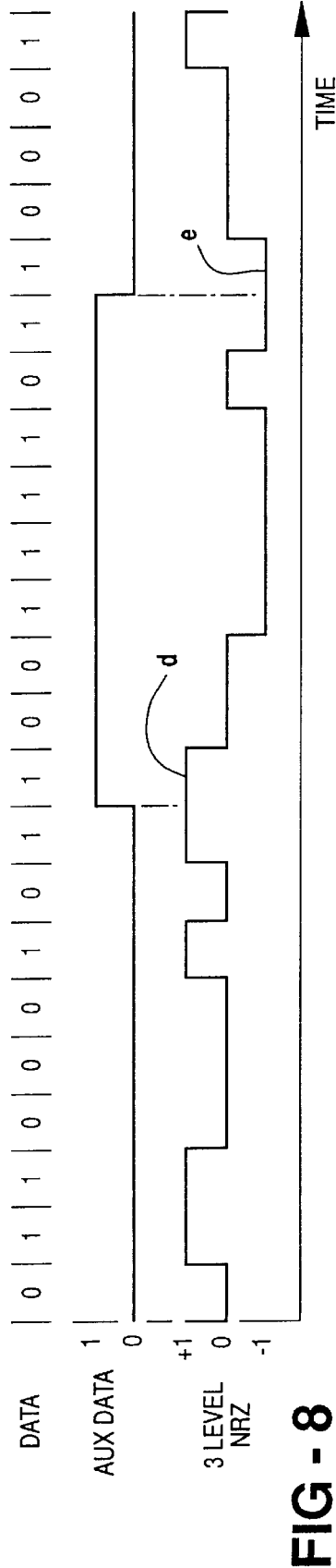
FIG. 8 is a set of waveforms illustrating a trilevel waveform for transmitting radio signal data and secondary data from a receiver module to the central processor.

An example of a three level NRZ format is given in FIG. 8. There a pulse amplitude modulated signal has a zero level representing "0" and a +1 and a −1 level both representing "1". The general rule is that alternating runs of 1's will use opposite levels. The rule is violated in response to auxiliary data which is supplied at a low data rate. For example, following a 0, if the next 1 should be +1 according to the general rule, a transition instead to −1 will indicate secondary information. Such a rule violation occurs at pulses d and e, thereby signaling transitions in the auxiliary data.

The transceiver case adds the requirement that high speed data from the central processor be combined with the clock and low speed data. If the combined high speed plus low speed data rate does not exceed the clock rate, simple PWM can still be used. If more is needed, conventional biphase coding with rule violations can be used at the expense of more sophisticated clock recovery. Another approach is to keep the dedicated clock edge and put more information on the other edge by using more than two pulse widths.

Remote Microphone Module

Figure 9:
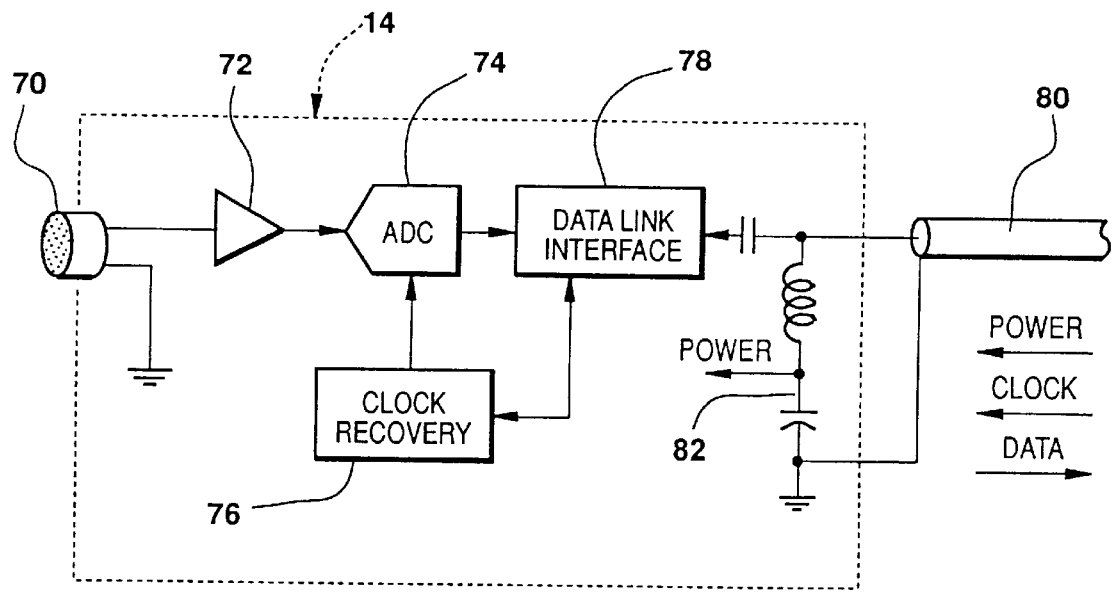
FIG. 9 is a diagram of a microphone module of the system of FIG. 1.

A block diagram of a typical microphone module 14 is shown in FIG. 9. The acoustic signal is converted to an electrical signal by the microphone 70, amplified by amplifier 72, and converted to digital by an ADC 74. In a clock recovery circuit 76 the required sample clock is derived from a remote reference in the central processor via a DLI 78 and an interconnect cable 80. The output of the ADC is transmitted to the central processor by the DLI 78.

The remote microphone module 14 interfaces the microphone 70 itself to the central DRSP 10 via an appropriate digital interconnect. The preferred interconnect is a single electrical cable 80 carrying all primary and secondary signals, plus power, although other interconnect scenarios are possible. An LC filter 82 separates the DC power supplied by cable 80.

The module must contain sufficient circuitry to digitize the acoustic signal and exchange information with the digital interconnect. It is possible to have multiple microphones connected to a single module, for example in a phased-array, and is within the scope of the general architecture.

The acoustic signal present on the microphone itself is considered the primary signal. Secondary information must also be communicated with the central processor. An example of secondary information is a reference clock.

The module must be packaged so as not to complicate the vehicle assembly process. A small module containing the microphone element and circuitry located at the microphone position is preferred, although other packaging scenarios are possible.

Microphone Module Data Link

The remote microphone modules 14 must send primary data and receive a reference clock from the central processor via the data link. This requirement is a subset of that required for the remote antenna module and can therefore use the same basic techniques.

Remote Speaker Module

The remote speaker module 16 interfaces the loudspeaker or loudspeakers 84 to the central DRSP 10 via an appropriate digital interconnect. The module must contain sufficient circuitry to exchange information with the digital interconnect and produce an amplified signal to drive the loudspeaker. It is possible to have multiple loudspeakers connected to a single module, for example in a localized cluster such as a door, and is within the scope of the general architecture.

The audio signal to be amplified and produced by the loudspeaker is considered the primary signal. Secondary information such as a reference clock must also be communicated with the central processor.

The preferred interconnect is a fiber optic network capable of audio, video, and packet data as well as details for power distribution.

An alternative approach would be to use a number of dedicated interfaces and a standard protocol, such as SPDIF (Sony-Philips Digital Interface Format). The SPDIF format is a biphase format (embedded clock) which supports audio (primary) data as well as user (secondary) data and is sufficient to meet the requirements of the distributed architecture.

The module must be packaged so as not to complicate the vehicle assembly process. A small module containing interface and amplifier circuitry and mounted directly to a loudspeaker element is preferred.

Figure 10:
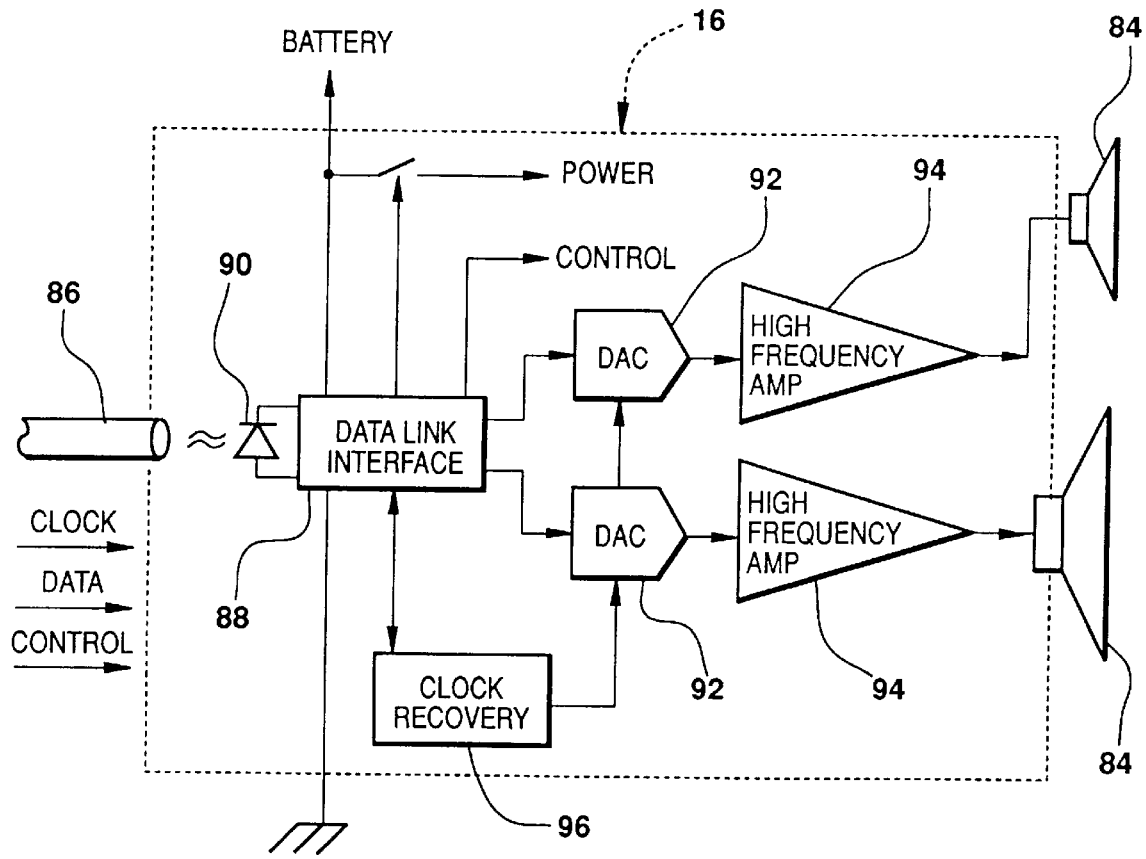
FIG. 10 is a diagram of a speaker module of the system of FIG. 1.

A block diagram of a typical speaker module 16 is shown in FIG. 10. The audio signal in digital form is received by the module 16 from the central processor via the fiber optic interconnect 86 and a DLI 88. The DLI includes an input element comprising a photo-diode 90 responsive to digital light signals on the fiber optic interconnect. The analog signal is reconstructed by a high quality audio DAC 92 for each speaker and amplified by high efficiency amplifiers 94 to drive the loudspeakers. Clock data received from the interconnect is operated upon by a clock recovery circuit 96. Power is supplied to the DLI of the module by suitable conductors connected to the vehicle battery. Power is supplied to the remainder of the module elements as determined by a control signal.

Example of FM Antenna Module

An FM tuner 38 is described here as an example. The tuner is intended to be a very small module capable of being located at the base of the antenna where it can tune a physically small antenna to achieve better sensitivity. The FM tuner module will select the channel of interest, digitize that channel and transmit a digital representation of the signal to the central processor. The tuner will connect to the main unit via a single coaxial cable 22 carrying all necessary signals in both directions. The tuner is to be frequency agile, capable of tuning to a new frequency and phase in less than 0.1 msec. The tuner signal path will consist of a wide dynamic range front-end and mixer (or local oscillator, LO) 46, a 10.8 MHz IF filter 48 with a single ceramic filter and an ADC 52, which preferably is a sigma-delta modulator to digitize the signal. The four main sections of the single IC module are the analog section 44–50, the sigma-delta modulator 52, the frequency synthesizer 56 and the data link interface 60.

Analog Section

The analog portion of the FM tuner is fairly conventional but optimized to relax the requirements on the filters which must be external to the IC. A quadrature mixer should suppress the image response enough to eliminate the need for a second tuned RF circuit. AGC levels and time constants are derived digitally to allow for very fast settling, particularly when returning to a signal of known level. A single ceramic IF filter protects the sigma-delta ADC from most of the extraneous signals while final channel isolation is done in the digital domain by the central processor.

Sigma-Delta Modulator Section

The 200 kHz wide signal of interest, centered at 10.8 MHz, is sampled and converted to a pulse density modulated (PDM) waveform by a band-pass sigma-delta modulator operating at 43.2 MHz (4×IF). (Note: 10.8 MHz is used for IF rather than the traditional 10.7 MHz for convenience in downstream processing at integer kHz rates) At this frequency, a minimum of a sixth order band-pass modulator is needed to give adequate signal to noise with reasonable filtering and AGC ahead of the converter.

Frequency Synthesizer Section

The image canceling 46 mixer needs to be driven with two signals in quadrature at a frequency of 10.8 MHz above the desired channel frequency. Almost all of the world's FM stations are assigned on integer 100 kHz channels in the range 76.0 to 107.9 MHz. Therefore, the synthesizer needs to be capable of tuning 86.8 to 118.7 MHz in 0.1 MHz steps.

The output of the synthesizer which drives the mixer (the LO) needs to be spectrally pure across a wide band. However, it can be a square wave since the mixer tends to hard limit the LO (but not the signal) which creates harmonics of the LO (mostly odd). These are sufficiently out of band to not cause a problem.

It is desirable that all antenna modules, or at least those associated with similar services, utilize a common frequency reference. To achieve this requires that the reference signal be provided to the remote modules from the central processor via the data link. The purity requirement of the LO requires that the reference signal also be rather spectrally pure. Since data from the central processor must also be communicated over this link, the purity requirement of the reference is best accommodated if the data encoding format of the data link is chosen to have explicit clock information. An example of such an encoding format would be PWM of FIG. 6 where one edge of the signal is always maintained while the other is varied to represent information. The stable edge provides a regular event from which a stable clock can readily be recovered and used as the frequency reference for the synthesizer.

It will thus be seen that the distributed architecture of the invention allows the digital signal processor to be isolated from the analog circuits to minimize the electrical noise affecting analog circuits. It also reduces analog content of a radio system and maximizes the digital processing.

What is claimed is:

1. A distributed digital radio system comprising:

a central digital radio signal processor (DRSP) having data link interface devices for coupling to data links;

a plurality of speaker modules remote from and coupled to the signal processor by at least one data link, each speaker module having at least one speaker, a data link interface for receiving data from the data link, a digital-to-analog converter, and an amplifier coupled to the converter for each speaker;

an antenna module remote from and coupled to the digital signal processor by a data link, the antenna module having analog circuitry for coupling to an antenna and processing radio signals, converter means for converting between analog and digital signals, a and a data link interface for coupling digital signals to the data link.

2. A radio system as defined in claim 1 wherein:

the analog circuitry in the antenna module has means for performing tuner functions for selecting a channel.

3. A radio system as defined in claim 1 wherein:

the analog circuitry in the antenna module has means for performing tuner functions for selecting a channel; and a digitally controlled frequency synthesizer in the antenna module effects tuning and is controlled by the DRSP via the data link.

4. A radio system as defined in claim 1 wherein the analog circuitry in the antenna module has an RF amplifier and means for performing tuner functions including an IF filter, a mixer and a digitally controlled frequency synthesizer for selecting a channel.

5. A radio system as defined in claim 1 wherein for receiver applications the data link and the data link interface carry data signals to the DRSP and carry clock and control signals to the antenna module.

6. A radio system as defined in claim 1 wherein for transmitter/receiver applications the analog circuitry in the antenna module includes a digitally controlled frequency synthesizer and for each of transmitter and receiver functions includes an IF filter, a mixer coupled to the synthesizer, and an RF amplifier.

7. A radio system as defined in claim 1 wherein for transmitter/receiver applications the data link and the data link interface carry data signals between the antenna module and the DRSP and carry clock and control signals to the antenna module.

8. A radio system as defined in claim 1 wherein the data link is an electrical cable which carries data signals between the antenna module and the DRSP and carries clock and control signals as well as power to the antenna module.

9. A radio system as defined in claim 1 wherein:

the DRSP includes means for imposing a stream of clock pulses on the digital links, each clock pulse initiating a data bit; and means for modulating the data bits to include digital information on the pulse stream.

10. A radio system as defined in claim 1 wherein:

the DRSP includes means for imposing a stream of clock pulses on the digital links, the rising edge of each pulse marking a clock event; and means for pulse width modulating the pulses by varying the falling edges to include digital information on the pulse stream.

11. A radio system as defined in claim 1 wherein the DRSP includes:

means for imposing three signal levels on the digital links comprising +1, 0 and −1 levels wherein both +1 and −1 represent a digital "1" and the 0 level represents a digital "0";

means for alternating runs of 1's between +1 and −1 levels as a general rule to transmit primary data; and means for violating the rule by repeating successive runs of 1's at the same level to insert a bit of secondary data.

12. A radio system as defined in claim 1 wherein the DRSP includes:

means for producing a no return to zero waveform representing primary data wherein transitions to zero occur only between successive bits of the opposite values; and means responsive to the state of low frequency auxiliary data for retarding transitions by a fraction of a bit space during one state of auxiliary data and advancing transitions by a fraction of a bit space during the opposite state of auxiliary data, thereby encoding the auxiliary data on the primary data.

13. A radio system as defined in claim 1 wherein:

the data link is a fiber optic link for supplying clock and control signals as well as audio data to the speaker module;

a photodiode couples the data link to the interface; and a line connects electrical power to the speaker module.

14. A radio system as defined in claim 1 including a microphone module connected to the DRSP by a data link and having:

a microphone;

an amplifier and an analog-to-digital converter serially coupled to the microphone; and a data link interface for coupling the converter to the data link, whereby acoustic signals sensed by the microphone are digitized and transmitted to the DRSP.

15. A distributed digital radio system comprising a central digital radio signal processor (DRSP) having an input data link interface (DLI) and an output DLI;

a plurality of antenna modules remote from the DRSP, each comprising an antenna, tuner circuitry, an analog-to-digital converter (ADC) for producing a digitized signal corresponding to a received analog signal, and a first remote DLI coupled to the ADC, the first remote DLI of each antenna module being connected to the input DLI of the DRSP by a corresponding data link to carry digitized signals between the DRSP and the respective antenna module;

at least one speaker module remote from the DRSP comprising a speaker, a second remote DLI, a digital-to-analog converter, and an amplifier for driving the speaker; and a second data link connecting the output DLI of the DRSP to the second remote DLI for supplying a digitized audio signal to the speaker module.

16. The invention as defined in claim 15 including:

a microphone module comprising a microphone, an ADC and a third remote DLI;

a data link connecting the third remote DLI to the DRSP for supplying a digitized microphone signal to the DRSP; and the antenna module has means for receiving digitized signals on the first data link and means for transmitting a radio signal corresponding to the microphone signal.

17. The invention as defined in claim 15 wherein each of the first remote and the input DLIs comprises:

a transmitting circuit for coupling a digital signal to the first data link; and a receiving circuit for coupling to the first data link to receive all data on the link and having means for canceling the digital signal from the transmitting circuit to produce a received digital signal.

18. The invention as defined in claim 15 wherein each of the first remote and the input DLIs comprises:

a transmitting amplifier coupled through a resistor and a capacitor to the first data link for transmitting signals to the link; and a receiving amplifier having differential inputs connected across the resistor for receiving signals from the link and subtracting signals from the transmitting amplifier to produce a received digital signal.

* * * * *